No. 641,602. Patented Jan. 16, 1900.
W. McGUNNIGLE.
TRUCK OR ROLLER.
(Application filed Apr. 27, 1899.)
(No Model.)

Witnesses:
Oscar F. Hill
Edith J. Anderson.

Inventor
William McGunnigle
by Macleod Calver Randall
his Attorneys.

UNITED STATES PATENT OFFICE.

WILLIAM McGUNNIGLE, OF BROCKTON, MASSACHUSETTS.

TRUCK OR ROLLER.

SPECIFICATION forming part of Letters Patent No. 641,602, dated January 16, 1900.

Application filed April 27, 1899. Serial No. 714,682. (No model.)

*To all whom it may concern:*

Be it known that I, WILLIAM McGUNNIGLE, a citizen of the United States, residing at Brockton, in the county of Plymouth and State of Massachusetts, have invented certain new and useful Improvements in Trucks or Rollers, of which the following is a specification, reference being had therein to the accompanying drawings.

The invention consists in a truck or roller of novel construction having an elastic or yielding body or periphery composed usually of india-rubber. The latter is employed for the purpose of securing noiseless working and of preventing wear and injury to the surface on which the roller rests or over which it is caused to travel.

The invention is designed for application to rollers for a great variety of purposes and uses wherever freedom from noise is desired or it is sought to guard against injury to the surface on which the roller rests.

The particular object of the invention is to provide in improved manner for securing the rubber or other yielding body or periphery of the roller to the metallic or other hub which is employed. Heretofore in rollers of the same class serious difficulty has been experienced in providing for the proper retention of the elastic and yielding body or periphery in place upon the central hub without splitting or becoming quickly impaired under the strain and pressure of use.

Figure 1:
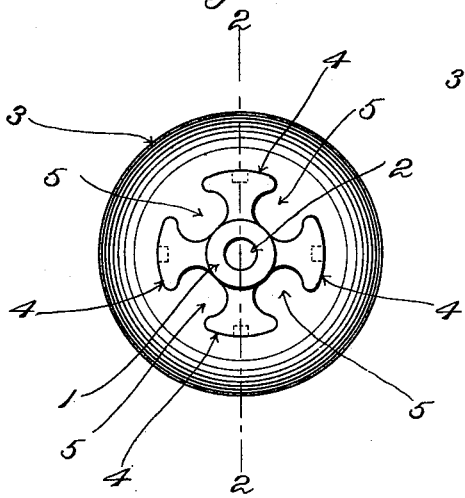
Figure 3:
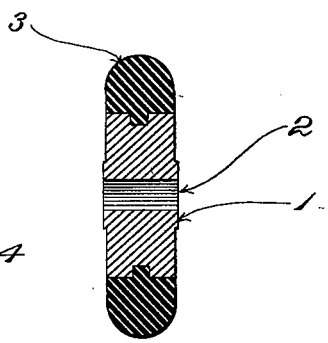
Figure 2:
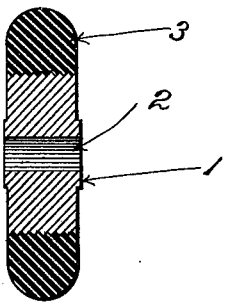

Figure 1 of the drawings shows in side elevation a roller constructed in accordance with the invention. Fig. 2 is a view thereof in cross-section on the dotted line 2 2 of Fig. 1. Fig. 3 is a view similar to Fig. 2, but showing a slight modification.

Having reference to the drawings, 1 designates the central hub of the roller, the same being constructed in practice of suitable material—such, for instance, as metal—and it having in the present embodiment of the invention an opening 2 therethrough for the reception of a supporting-pin, journal, or the like.

3 designates the elastic or yielding body or peripheral covering of india-rubber, the same being molded at its exterior and periphery into any desired form which will meet the requirements of the use to which it is contemplated the roller shall be put. I have herein shown a periphery which is rounded transversely, and the particular embodiment of the invention which is illustrated herein has been designed more especially for employment as a caster in connection with stage-scenery. The peripheral covering of rubber is firmly adherent to the surface of the hub 1, being molded thereto and united therewith in the process of vulcanization. Among the various uses to which different embodiments of the invention may be put may be mentioned casters for any kind of furniture, beds, chairs, and sofas, trucks of all kinds, dry-goods baskets, folding doors, hospital beds and trucks, and hanging doors in barns. The hub 1 is formed with a radiating series of projections or arms, as 4 4, &c. The india-rubber or covering 3 projects into and completely fills the spaces which intervene between the said projecting portions or arms. For the purpose of locking the rubber in place, so as to prevent both outward radial movements thereof and also a lateral or transverse bending or twisting thereof, which would tend to withdraw the inwardly-projecting portions 5 5 of the rubber from between the said arms or projections 4 4, I form the latter undercut on opposite sides thereof so that the said spaces 5 5 are larger in their inner portions than they are between the expanded outer portions or heads of the arms. The rubber thereby effectually is anchored against movements such as have been referred to. For the purpose of preventing the rubber body or covering from becoming displaced transversely with reference to the hub I form the outer ends of the arms 4 4 rough or uneven, so that the rubber may take a better hold thereof than it would if the surface were smooth. Thus I form a series of parallel corrugations extending peripherally around the hub at the outer end of the said arms, as shown in Fig. 2, or I may form in the outer ends of the said arms pits or cavities into which portions of the rubber may enter, as indicated in Fig. 3, these pits or cavities being used either alone or in conjunction with the corrugations, as may be preferred.

I claim as my invention—

1. The herein-described roller comprising a central hub and the elastic or yielding body or covering firmly adherent to the said hub and vulcanized thereto, the said hub having the series of radially-extending arms separated by the interiorly-enlarged spaces which are filled by inwardly-projecting portions of the rubber, whereby the said body or covering is locked to the said hub.

2. The herein-described roller comprising the central hub and the elastic yielding body or covering, the said hub having the series of radially-extending arms separated by the interiorly-enlarged spaces which are filled by inwardly-projecting portions of the rubber, whereby the said body or covering is locked to the said hub, the outer faces of the said arms being roughened to prevent the body or covering from slipping transversely with reference thereto.

3. The herein-described roller comprising the central hub and the elastic or yielding body or covering, the said hub having the series of radially-extending arms separated by the interiorly-enlarged spaces which are filled by inwardly-projecting portions of the rubber, whereby the said body or covering is locked to the said hub, the outer surfaces of the said arms being circumferentially corrugated for better engagement with the rubber.

In testimony whereof I affix my signature in presence of two witnesses.

WILLIAM McGUNNIGLE.

Witnesses:
CHAS. F. RANDALL,
WM. A. MACLEOD.